United States Patent [19]
Ovshinsky et al.

[11] Patent Number: 5,569,563
[45] Date of Patent: Oct. 29, 1996

[54] NICKEL METAL HYBRIDE BATTERY CONTAINING A MODIFIED DISORDERED MULTIPHASE NICKEL HYDROXIDE POSITIVE ELECTRODE

[76] Inventors: Stanford R. Ovshinsky, 2700 Squirrel Rd., Bloomfield Hills, Mich. 48013; Dennis A. Corrigon, 3793 Burkoff Dr., Troy, Mich. 48084; Peter Benson, 490 Miller Ave., #105, Rochester, Mich. 48307; Cristian A. Fierro, 528 E. Big Beaver Rd., Troy, Mich. 48083

[21] Appl. No.: 300,610

[22] Filed: Sep. 2, 1994

Related U.S. Application Data

[63] Continuation-in-part of Ser. No. 27,973, Mar. 8, 1993, Pat. No. 5,348,822, which is a continuation-in-part of Ser. No. 975,031, Nov. 12, 1992, Pat. No. 5,344,728.

[51] Int. Cl.$^6$ .............................. H01M 4/32; H01M 4/52
[52] U.S. Cl. ..................... 429/223; 429/218; 429/232
[58] Field of Search ................................... 429/223, 232, 429/218

[56] References Cited

U.S. PATENT DOCUMENTS

| | | | |
|---|---|---|---|
| 3,597,829 | 8/1971 | Wagner | 29/420.5 |
| 4,000,005 | 12/1976 | McBreen | 429/212 |
| 4,985,318 | 1/1991 | Oshitani et al. | 429/223 |
| 5,366,831 | 11/1994 | Watada et al. | 429/232 |

FOREIGN PATENT DOCUMENTS 61-283173  12/1986  Japan.

OTHER PUBLICATIONS

Askeland, *The Science and Engineering of Materials*, PWS Engineering, Boston, MA pp. 181–182. 1984 (no month).
Peters et al. *Chemical Separations and Measurement*, Saunders Company, pp. 200–202 1974 (no month).

*Primary Examiner*—Prince Willis, Jr.
*Assistant Examiner*—Carol Chaney

[57] ABSTRACT

A high capacity, long cycle life, positive electrode for use in an alkaline rechargeable electrochemical cell comprising: a solid solution nickel hydroxide material and carbon. The carbon acts to promote the multiphase structure and increase conductivity.

17 Claims, No Drawings

NICKEL METAL HYBRIDE BATTERY CONTAINING A MODIFIED DISORDERED MULTIPHASE NICKEL HYDROXIDE POSITIVE ELECTRODE

CONTINUING INFORMATION

This application is a continuation-in-part of U.S. patent application Ser. No. 08/027,973 filed Mar. 8, 1993, (which issued as U.S. Pat. No. 5,348,822) which is a continuation-in-part of U.S. patent application Ser. No. 07/975,031 filed Nov. 12, 1992 (which issued as U.S. Pat. No. 5,344,728).

FIELD OF THE INVENTION

The present invention relates generally to an optimized nickel hydroxide positive electrode. More specifically, this invention relates to modified nickel hydroxide positive electrode material formed by the addition of carbon material to disordered nickel hydroxide material. In such materials capacity is increased due to increased utilization and cycle life is increased due to phase stabilization.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as calculators, portable radios, and cellular phones. They are often configured into a sealed power pack that is designed as an integral part of a specific device. Rechargeable alkaline cells can also be configured as larger cells that can be used, for example, in industrial, aerospace, and electric vehicle applications.

The best rechargeable alkaline cells are ones that can operate as an "install and forget" power source. With the exception of periodic charging, a rechargeable alkaline cell should perform without attention and should not become a limiting factor in the life of the device it powers.

Stanford R. Ovshinsky, by applying his fundamental principles of disorder, pioneered the development of the first commercial nickel metal hydride (NiMH) battery. For more than three decades, virtually every other manufacturer in the world studied the NiMH battery technology, but no commercial battery of this kind existed until after the publication of U.S. Pat. No. 4,623,597 to Ovshinsky and Ovshinsky's related technical papers which disclosed basic and fundamentally new principles of battery material design. NiMH batteries are the only truly "green" battery because they can be completely recycled. NiMH batteries are the only rechargeable battery that can meet society's requirements for an ecological, renewable source of electrochemical energy.

Ni-MH cells utilize a negative electrode that is capable of the reversible electrochemical storage of hydrogen. Ni-MH cells usually employ a positive electrode of nickel hydroxide material. The negative and positive electrodes are spaced apart in the alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation (1):

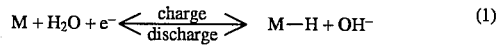

$$M + H_2O + e^- \underset{\text{discharge}}{\overset{\text{charge}}{\rightleftarrows}} M-H + OH^- \quad (1)$$

The negative electrode reactions are reversible. Upon discharge, the stored hydrogen is released to form a water molecule and release an electron. The reactions that take place at the nickel hydroxide positive electrode of a Ni-MH cell are shown in equation (2):

$$Ni(OH)_2 + OH^- \underset{\text{discharge}}{\overset{\text{charge}}{\rightleftarrows}} NiOOH + H_2O + e^- \quad (2)$$

Ni-MH materials are discussed in detail in U.S. Pat. No. 5,277,999 to Ovshinsky, et al., the contents of which are incorporated by reference.

As previously mentioned, Stanford R. Ovshinsky was responsible for inventing new and fundamentally different electrochemical electrode materials. As predicted by Ovshinsky, detailed investigation by Ovshinsky's team determined that reliance on simple, relatively pure compounds was a major shortcoming of the prior art. Relatively pure crystalline compounds were found to have a low density of hydrogen storage sites, and the type of sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. Ovshinsky's use of disordered materials has fundamental scientific advantages. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously found that the number of surface sites could be significantly increased by making an amorphous film that resembled the surface of the desired relatively pure materials. As Ovshinsky explained in *Principles and Applications of Amorphicity, Structural Change, and Optical Information Encoding*, 42 *Journal De Physique* at C4-1096 (October 1981):

Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . . .

Once amorphicity was understood as a means of introducing surface sites in a film, it was possible to produce "disorder" that takes into account the entire spectrum of local order effects such as porosity, topology, crystallites, characteristics of sites, and distances between sites. Thus, rather than searching for material modifications that would yield ordered materials having a maximum number of accidently occurring surface irregularities, Ovshinsky's team at ECD began constructing "disordered" materials where the desired irregularities were tailor made. See, U.S. Pat. No. 4,623,597, the disclosure of which is incorporated by reference.

The term "disordered," as used herein corresponds to the meaning of the term as used in the literature, such as the following:

> A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . . S. R. Ovshinsky, *The Shape of Disorder*, 32 *Journal of Non-Crystalline Solids* at 22 (1979) (emphasis added).

The "short-range order" of these disordered materials are further explained by Ovshinsky in *The Chemical Basis of Amorphicity: Structure and Function*, 26:8–9 Rev. Roum. Phys. at 893–903 (1981):

> [S]hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce, for the first time, commercially viable batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to conventional ordered materials. These additional sites are responsible for improved efficiency of electrochemical charging/discharging and an increase in electrical energy storage capacity. The nature and number of storage sites can even be designed independently of the catalytically active sites. More specifically, these disordered multi-component alloys are thermodynamically tailored to allow storage of hydrogen atoms at a wide range of modulated bonding strengths within the range of reversibility suitable for use in secondary battery applications.

Based on these principles of disordered materials, described above, a family of extremely efficient electrochemical hydrogen storage materials were formulated. These are the Ti-V-Zr-Ni type active materials such as disclosed by Ovshinsky's team in U.S. Pat. No. 4,551,400 ("the '400 Patent'), the disclosure of which is incorporated by reference. These materials reversibly form hydrides in order to store hydrogen. All the materials used in the '400 Patent utilize a Ti-V-Ni composition, where at least Ti, V, and Ni are present with at least one or more of Cr, Zr, and Al. The materials of the '400 Patent are generally multiphase polycrystalline materials, which may contain, but are not limited to, one or more phases of Ti-V-Zr-Ni material with $C_{14}$ and $C_{15}$ type crystal structures. Other Ti-V-Zr-Ni alloys may also be used for fabricating rechargeable hydrogen storage negative electrodes. One such family of materials are those described in U.S. Pat. No. 4,728,586 ("the '586 Patent"), titled *Enhanced Charge Retention Electrochemical Hydrogen Storage Alloys and an Enhanced Charge Retention Electrochemical Cell*, the disclosure of which is incorporated by reference.

The characteristic surface roughness of the metal electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are believed to be important in determining its macroscopic electrochemical characteristics.

In addition to the physical nature of its toughened surface, it has been observed that V-Ti-Zr-Ni alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—appears to interact with chromium alloys in catalyzing various hydride and dehydride reaction steps. To a large extent, many electrode processes, including competing electrode processes, are controlled by the presence of chromium in the hydrogen storage alloy material, as disclosed in the '586 Patent.

Rechargeable alkaline cells can be either vented cells or sealed cells. During normal operation, a vented cell typically permits venting of gas to relieve excess pressure as part of the normal operating behavior. In contrast, a sealed cell generally does not permit venting on a regular basis. As a result of this difference, the vent assemblies and the amounts of electrolyte in the cell container relative to the electrode geometry both differ significantly.

Vented cells operate in a "flooded condition." The term "flooded condition" means that the electrodes are completely immersed in, covered by, and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is with only the minimum amount of electrolyte necessary to permit gas recombination. The enclosure for a sealed cell is normally metallic and the cell may be designed for operation at up to about 100 p.s.i. absolute or higher. Because they are sealed, such cells do not require periodic maintenance.

Typically, a sealed rechargeable alkaline cell for use in consumer appliances, such as a C cell, uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of nylon or polypropylene, for example. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a NiCd negative electrode and a Ni-MH negative electrode are both provided in excess, to maintain the optimum capacity and provide overcharge protection.

The operational lifespan, that is, the available number of charge and discharge cycles of a sealed cell, typically determines the kinds of applications for which a cell will be useful. Cells that are capable of undergoing more cycles have more potential applications. Thus, longer lifespan cells are more desirable.

An additional goal in making any type of electrode is to obtain as high an energy density as possible. A high energy density nickel hydroxide electrode provides for improved gravimetric energy density in nickel batteries, especially nickel-metal hydride batteries. It also provides for lower battery cost by reducing the amount of nickel hydroxide materials required and thus significantly lowering the materials cost.

Cobalt has also long been used as an additive to nickel hydroxide electrode materials. Cobalt is usually added to nickel hydroxide at a level of 0–5% in commercial applications. This level of cobalt is used to improve the speed of activation, increase resistance to poisons, and marginally improve capacity. It is generally believed that the major reason the cobalt is effective in these areas is through an increase in conductivity within the nickel hydroxide matrix.

On the other hand, Zn and Cd are added to nickel hydroxide to improve cycle life and high temperature operation. The mechanism for these improvements is thought to be related to two functions. Cycle life is extended by decreasing swelling brought on by density changes between the oxidized and reduced states of the nickel hydroxide. Cd and Zn incorporated into the nickel hydroxide reduce the swelling by reducing the difference in density in the charged and discharged condition and increasing the mechanical stability of the nickel hydroxide itself. The exact mechanism is not quite clear, but may be related to improving the ductility of the nickel hydroxide to minimize disintegration and surface area formation. Cd and Zn improve high temperature operation by raising the oxygen overvoltage such that charging efficiency at high temperature is increased, thereby preventing the premature evolution of oxygen that typically occurs from standard nickel hydroxides at high temperature.

Prior art modifications to nickel hydroxide by Co, Zn, and Cd do not address the special requirements of Ni-MH batteries, particularly when Ni-MH batteries are used in electric vehicles. Because Ni-MH negative electrodes have an extremely high storage capacity, the nickel hydroxide positive electrode material is essentially the limiting factor in the overall battery energy density. This makes extending the performance of the nickel hydroxide in all areas more important than in the past.

The prior art teaches the use of 0–10% cobalt coprecipitated additives to improve capacity and utilization. With the use of up to 10% cobalt as described in the prior art, the utilization can be improved to only about 100% of the theoretical one-electron capacity (capacity equivalent to one electron transferred for each nickel atom). The prior art additionally teaches combinations of cobalt and zinc or cadmium additives typically in the proportions of 0–5% each. These additives provide useful benefits in terms of cycle life and high temperature performance. However, they do not provide for utilizations in excess of the one-electron capacity. In fact, they tend to stabilize the capacity at lower levels. The use of radically higher cobalt levels (20% and more) and special methods of preparation such as exemplified by Delmas are scientifically interesting. However, these materials, described as crystalline as opposed to the disordered materials in the present invention, are impractical due to the high cost of cobalt and do not provide stable capacities in excess of the one-electron theoretical capacities.

The use of carbon in nickel hydroxide positive electrodes dates back to the time of Thomas Edison. Edison ultimately had problems with graphite containing electrodes and abandoned them in favor of nickel flakes. In the 1960's, their was a resurgence of interest in the use of graphite in plastic bonded electrodes. This resurgence was short lived because the life of these electrodes was very poor. In the 1970s and 1980s, the life of plastic bonded electrodes improved dramatically as a result of the appearance of high purity graphite that was resistant to oxidation. These cells had sufficient life for problems with power performance to appear. The use of carbon is discussed, for example, in the following references:

U.S. Pat. No. 5,200,282 describes spherical nickel hydroxide positive electrode materials with coprecipitated additives loaded into a nickel fiber mat substrate. Conductive additives such as nickel, cobalt, and carbon are described. There is no teaching or suggestion of disordered nickel hydroxide materials; or that high utilizations can be achieved through the use of the described additives. In fact, this patent specifically teaches that γ-phase NiOOH material can be inhibited by improving the conductivity of the active material by the addition of cobalt or carbon.

U.S. Pat. No. 4,663,256 describes a nickel hydroxide electrode formed using electrodeposited nickel dendrites onto which a mixture of nickel hydroxide, conductive particles less than 10 microns in diameter (graphite), and a plastic binder are coated. This patent is primarily concerned with increased substrate and nickel hydroxide contact due to the increased surface area provided by nickel dendrites.

U.S. Pat. No. 4,177,157 describes formulating a suspension of PTFE, nickel hydroxide, and a conductive diluent like graphite, silicon carbide, or nickel; and removing excess water from the suspension to form a filter cake around the current collector. The use of fibrous or particlulate graphite in sufficient quantity to constitute about 30% by weight of the final filter cake is described. The reference states that graphite particles from 0.5 to 5.0 microns should be used because particles greater than 5 microns have poor conductivity and particles less than 0.5 microns produce only short lived electrodes.

U.S. Pat. No. 4,000,005 describes a process of suspending nickel hydroxide, PTFE, and graphite in isopropyl alcohol; adding polyvinylidene fluoride in a solvent. The fluoride forms a coagulate which is impregnated into and separated from the medium/solvent when drawn through a conductive grid. The use of silicon carbide and nickel, as well as graphite, as conductive diluents is also disclosed.

U.S. Pat. No. 3,640,772 describes forming nickel positive electrodes by combining nickel hydroxide, graphite, polyethylene powder in xylene, evaporating the solvent, adding graphite powder, and pressing the mixture into nickel gauze.

CN 1,076,313 describes a nickel hydrogen battery in a "jelly roll" configuration using a pasted positive electrode containing powdered Ni, Cu, graphite, Co, $Co(OH)_2$, CoO, ethylene black, and a binder chosen from PVA, CMC, PTFE, and Me cellulose; and a negative electrode of modified $LaNi_5$ material. In all these references, graphite acts as a conductive diluent that marginally improves the discharge capacity or rate capability of the nickel hydroxide electrode without promoting the use of disordered nickel hydroxide, hence without achieving utilizations in excess of the one-electron theoretical capacity.

SUMMARY OF THE INVENTION

One objective of the present invention is a nickel metal hydride battery capable of improved capacity and performance at a reduced cost.

These and other objectives of the present invention are satisfied by a nickel metal hydride battery containing a disordered positive electrode for use in an alkaline rechargeable electrochemical cell comprising a solid solution nickel hydroxide electrode material having a multiphase structure and carbon. The carbon acts to promote the multiphase structure and increase conductivity.

The disordered positive electrode preferably comprises a solid solution nickel hydroxide material having a multiphase structure that comprises at least one polycrystalline γ-phase including a polycrystalline γ-phase unit cell comprising spacedly disposed plates with at least one chemical modifier incorporated around said plates, said plates having a range of stable intersheet distances corresponding to a $2^+$ oxidation state and a $3.5^+$, or greater, oxidation state; and at least one compositional modifier incorporated into said solid solution nickel hydroxide material to promote said multiphase structure.

The disordered nickel hydroxide material of the present invention can also include at least one compositional modifier that is chosen from the group consisting of a metal, a metallic oxide, and a metallic oxide alloy. Preferably the at least one compositional modifier is chosen from the group consisting of Al, Bi, Co, Cr, Cu, Fe, In, La, Mn, Ru, Sb, Sn, Zn. More preferably, at least three of these additional modifiers are used. The at least one chemical modifier is preferably chosen from the group consisting of Al, Ba, Ca, Co, Cr, Cu, F, Fe, K, Li, Mg, Mn, Na, Sr, and Zn.

DETAILED DESCRIPTION OF THE INVENTION

While investigating the multiphase disordered materials of the present invention, originally described in U.S. Pat. No. 5,348,822 (the contents of which are incorporated by reference), it was discovered, quite unexpectedly, that including carbon served to further stabilize the γ-phase of these materials. The addition of carbon results in materials having substantially more stable capacity than any previously described materials and stable high utilization in excess of the theoretical one-electron capacity.

The improved capacity of the present materials relates to their multiphase disordered structure, improved stability, and increased conductivity. The added carbon appears to play a role in each of these characteristics. While these characteristics are discussed separately, it is believed that they are all interrelated such that improvements, for example, in stability lead to improvements in conductivity.

In prior art nickel hydroxide materials, cobalt was added to improve stability and encourage multiple electron transfer. In such material, fractionally more than one electrode is transferred. However, as discussed in U.S. Pat. No. 5,348,822, this effect is short lived.

The positive electrode material described in U.S. Pat. No. 5,344,728 is a disordered active material consisting of a 10% coprecipitated cobalt active material with layers of enriched cobalt substituted on the electrode surface. This material contains a nominal percentage of stabilized γ-phase material as a result of its disordered microstructure. Building on this work with disordered nickel hydroxide materials, the inventors of the present invention have found that predominantly γ-phase nickel hydroxide materials that are multiphased could be produced. The inventors of the present invention have found that the stability of the α- and γ-phases of these materials could be significantly improved with the addition of carbon. The nickel hydroxide positive electrode materials described in U.S. Pat. No. 5,348,822, exhibit multiple electron transfer. The present invention describes how this multiple electron transfer is further stabilized by the addition of carbon. The result of this stabilization is an increased cycle life for nickel metal hydride cells made using these materials.

The disordered materials of the present invention are compositionally and/or structurally disordered. "Compositionally disordered" as used herein is specifically defined to mean that this material contains at least one compositional modifier and/or a chemical modifier. The at least one compositional modifier may be a metal and/or a metallic oxide. Preferably, the compositional modifier is chosen from the group consisting of Al, Bi, Co, Cr, Cu, Fe, In, La, Mn, Ru, Sb, Sn, and Zn. Preferably, the chemical modifier is chosen from the group consisting of Al, Ba, Ca, Co, Cr, Cu, F, Fe, K, Li, Mg, Mn, Na, Sr, and Zn.

"Structurally disordered" as used herein is specifically defined to mean having a more conductive surface and filamentous regions of higher conductivity and multiple or mixed phases where α, β, and γ-phase regions may exist individually or in combination. The disordered materials of the present invention contain 8 to 30 atomic percent; preferable 10 to 20 atomic percent of at least one of the compositional modifiers or chemical modifiers described above. Materials of the present invention are formed when a compositional modifier is incorporated into the material itself. These compositional modifiers tend to disrupt the formation of large crystallites which can lead to higher resistance materials. The increased disorder due to smaller crystallites tends to provide electronic conductivity not present in more crystalline forms. Further, the local disorder caused by distortions surrounding these modifiers has a similar effect. Materials of the present invention can also be formed through charge and discharge treatments, particularly pulsed charging/discharging that encourage disorder, the formation of microcracks, and a reduction in particle size.

In order to form disordered materials containing 8 to 30 atomic percent chemical and compositional modifiers according to the present invention several processing variations may be utilized including coprecipitation of any number of compositional modifiers in a chemical conversion impregnation or electrochemical precipitation process, including that of high density, spherical type materials. These active materials may be used in all types of nickel battery positive electrodes including sintered electrodes, foam type pasted electrodes and fiber type pasted electrodes. The modifiers of the present invention may be added to conversion electrolytes during impregnation, formation, or activation, or directly to the electrolyte in a sealed or vented cell.

The disordered materials of the present invention are multiphase polycrystalline materials having at least one γ-phase that contain compositional modifiers or combinations of compositional and chemical modifiers that promote the multiphase structure and the presence of γ-phase materials. These compositional modifiers are chosen from the group consisting of Al, Bi, Co, Cr, Cu, Fe, In, La, Mn, Ru, Sb, Sn, and Zn.

As a result of their disordered structure and improved conductivity, these materials do not have distinct oxidation states such as $2^+$, $3^+$, or $4^+$. Rather, these materials form graded systems that pass 1.2 to 2 electrons.

The material of the present invention are also distinguished over the prior art by the non-substitutional incorporation of at least one chemical modifier around the plates of the nickel hydroxide electrode material. The phrase "non-substitutional incorporation around the plates", as used herein means the incorporation into interlamellar sites or at edges of plates. These chemical modifiers are preferably chosen from the group consisting of Al, Ba, Ca, Co, Cr, Cu, F, Fe, K, Li, Mg, Mn, Na, Sr, and Zn.

The focus of the prior art on the crystalline aspect of nickel hydroxide positive electrode materials is particularly obvious from the extensive efforts by Delmas to form crystalline γ-phase materials. Contrary to the prior art, the nickel hydroxide positive electrode materials of the present invention are disordered materials. The use of disordered materials permits us to permanently alter the properties of the material of the present invention by engineering the local and intermediate range order. The general principals of this are discussed above and in U.S. Pat. No. 4,623,597, the contents of which are incorporated by reference. The disordered nickel hydroxide positive electrode materials of the present invention are multiphase materials having a polycrystalline γ-phase that can additionally contain at least one structure selected from the group consisting of (i) amorphous; (ii) microcrystalline; (iii) polycrystalline lacking long range compositional order with three or more γ-phases of said polycrystalline structure; and (iv) any combination of said amorphous, microcrystalline, or polycrystalline structures.

Another reason for the improved performance of the present materials is that the chemical modifiers provide for electronic overlap between adjacent nickel hydroxide plates thereby increasing the inherent conductivity of the nickel hydroxide material. This latter possibility was considered previously (see, Corrigan, et al, 90-4 *Proceedings of the Symposium on Nickel Hydroxide Materials* 97 (1990). However, the prior art does not teach that major gains in specific capacity can be achieved by the incorporation of chemical modifiers between plates of disordered material such that these chemical modifiers provide electronic overlap through spatially extended d-orbitals as in the present invention.

The choice of disordered materials has fundamental scientific advantages: as seen, a substantial number of elements can be included in the lists of modifiers. These elements offer a variety of bonding possibilities due to the multidirectionality of d-orbitals. The multidirectionality of d-orbitals provides for a tremendous increase in density. A considerable increase in electron transfer capacity is possible in the disordered alloys of the present invention compared to crystalline structures such as described by Delmas. The preparation of disordered alloys produces large numbers of grain boundaries and a large surface area leading to the increased conductivity and hydrogen diffusion, and subsequently, multiple electron transfer of the materials of the present invention. Thus, in addition to compositional disorder, there occurs topological disorder at phase boundaries of the multi-phase alloy. This increases enormously the density of catalytic sites.

Additional improvement of the disordered material of to the present invention are possible when these disordered materials are combined with electrolytes where the electrolyte comprises at least one element chosen from the group consisting of Ba, Ca, Cs, K, Na, Rb, and Sr, combined with at least one member of the group consisting of Br, Cl, F, OH. Particular examples of such electrolytes are formulations of KOH and CsF and KOH and CsOH.

A significant improvement in the materials of the present invention result from the addition of 5–20%, preferably 15%, carbon. This carbon is preferably in the form of synthetic graphite particles that are less than 5 microns, most preferably less than 2 microns in size. It appears that carbon in the present invention acts to assure that some cycling of the nickel hydroxide material takes place in the disordered $\alpha/\gamma$ phases. This may be due to the lubricity of the graphite particles allowing for easier expansion/contraction of the nickel hydroxide active material during cycling. It may also be due to interaction effects between the hexagonal layer planes of the nickel hydroxide and graphite materials. (Hexagonal layers form the basis for the structure of graphite and the brucite structure of nickel hydroxide in its various forms.) Interactions of these proposed types could serve to break up the crystallinity of the nickel hydroxide structure and promote the stability of multiple disordered nickel hydroxide phases.

It is also believed that the addition of carbon in the materials of the present invention contributes to a density change that results in a higher surface area such that the electrolyte reactants within the nickel hydroxide have better catalysis. In addition, the conductivity is improved by the presence of additional filamentous conductive regions of carbon that extend from areas of high conductivity immediately adjacent to the nickel current collector to the exterior of individual nickel hydroxide particles. These conductivity regions permit discharge that could not otherwise occur. Thus, nickel hydroxide electrodes of the present invention have increased conductivity between the active material and the nickel current collector. As a result of increased electrode conduction and the expanded surface area of the substrate, the active material of the present invention essentially behaves like a thin film electrode.

The material of the present invention has been observed to transfer up to 1.6 electrons per atom during reversible cycling. Cycling tests currently underway indicate that multiple electron transfers remain stable throughout the life of the cell. Thus, it is expected that cells fabricated using the materials of the present invention would exhibit excellent capacity and extended cycle lives over previously described materials.

The materials of to the present invention can be prepared by formulating a paste of spherical nickel hydroxide, cobalt and zinc modifiers, synthetic graphite particles, and a PTFE binder. This paste is applied to a nickel foam or fiber substrate and formed with a 200% charge input. While graphite lowers the loading by interfering with packing efficiency, its stabilizing effect and the increased conductivity it provides more than compensates for this.

Additional improvement of the disordered material of to the present invention are possible when these disordered materials are combined with electrolytes where the electrolyte comprises at least one element chosen from the group consisting of Ba, Ca, Cs, K, Na, Ra, Rb, and Sr, combined with at least one member of the group consisting of Br, Cl, F, OH. Particular examples of such electrolytes are formulations of KOH, NaOH, CsF and CsOH and combinations thereof.

EXAMPLES

Example 1

A mixture was formulated from 57 g of triprecipitate nickel hydroxide powder with 5% coprecipitated cobalt (10 micron particle size), 11.25 g of synthetic graphite (2 micron particle size), and 6 g of cobalt powder (2 micron particle size). This mixture was ball milled for about 30 minutes. About 50 ml of water added to the milled mixture to produce a paste. A solution of 60% PTFE (density 1.5 g/cc) was formulated and 1 ml of this diluted to 10 ml with water. The diluted PTFE was mixed into the paste dropwise. An additional 16 ml of water was then added to keep the paste from becoming stiff and give it sufficient viscosity to penetrate the nickel foam substrate.

The paste was applied with a spatula to a 3 $in^2$ area of 110 ppi nickel foam metal weighing 0.9 g. Care was taken to avoid surface loading and the substrate was visible when the pasting was complete. The resulting electrode was dried at 60° C. for 30–60 minutes. The dried electrode was compressed from an initial thickness of 60 mils down to 23 mils in a roll mill. The final electrode weighed about 3 g and was loaded with about 2 g of dry paste. The composition of the resulting paste, by weight, was 76% spherical nickel hydroxide, 15% graphite, 8% cobalt, 1% PTFE.

Charge-discharge results for Example 1 are shown in Table 1 for multiple electrodes. The theoretical capacity is based a discharge capacity equivalent to one electron transferred per nickel atom in the nickel hydroxide active material. The experimental capacity was the discharge capacity obtained at the C/10 rate on cycle 2. During formation, the electrodes were subjected to a 200% charge (100% overcharge). After formation, the discharge capacity remained essentially steady during repeated charge-discharge cycles.

TABLE 1

| Positive Weight (g) | One Electron Theoretical Capacity (mAh) | Experimental Capacity (mAh) | Utilization (%) | Energy Density (mAh/g) |
|---|---|---|---|---|
| 2.97 | 383 | 601 | 157 | 202 |
| 3.01 | 390 | 601 | 154 | 200 |
| 3.15. | 416 | 638 | 153 | 202 |
| | Average | | 155 | 201 |

Example 2

An electrode was fabricated exactly as described in Example 1, however, 80 ppi foam was used to increase loading.

The results are shown in Table 2.

TABLE 2

| Positive Weight (g) | One Electron Theoretical Capacity (mAh) | Experimental Capacity (mAh) | Utilization (%) | Energy Density (mAh/g) |
|---|---|---|---|---|
| 3.11 | 445 | 578 | 130 | 186 |
| 3.11 | 445 | 577 | 130 | 186 |
| 3.02 | 428 | 559 | 130 | 185 |
| 3.05 | 433 | 523 | 121 | 171 |
| | Average | | 128 | 182 |

Example 3

An electrode was fabricated exactly as described in Example 1, however, 110 ppi foam was used and the graphite particles were 5 microns in size.

The results are shown in Table 3.

TABLE 3

| Positive Weight (g) | One Electron Theoretical Capacity (mAh) | Experimental Capacity (mAh) | Utilization (%) | Energy Density (mAh/g) |
| --- | --- | --- | --- | --- |
| 3.54 | 490 | 628 | 128 | 177 |
| 3.42 | 467 | 600 | 128 | 175 |
| 3.60 | 501 | 627 | 127 | 174 |
| 3.51 | 484 | 623 | 129 | 177 |
|  | Average |  | 128 | 176 |

Example 4

An electrode was fabricated exactly as described in Example 1, however, the graphite particles were 10 microns in size.

The results are shown in Table 4.

TABLE 4

| Positive Weight (g) | One Electron Theoretical Capacity (mAh) | Experimental Capacity (mAh) | Utilization (%) | Energy Density (mAh/g) |
| --- | --- | --- | --- | --- |
| 3.08 | 407 | 465 | 114 | 151 |
| 2.59 | 314 | 343 | 109 | 132 |
| 2.54 | 305 | 346 | 113 | 136 |
|  | Average |  | 112 | 140 |

Example 5

An electrode was fabricated exactly as described in Example 1, however, the a 18 micron wire fiber substrate was used.

The results are shown in Table 5.

TABLE 5

| Positive Weight (g) | One Electron Theoretical Capacity (mAh) | Experimental Capacity (mAh) | Utilization (%) | Energy Density (mAh/g) |
| --- | --- | --- | --- | --- |
| 2.29 | 221 | 279 | 126 | 123 |
| 2.26 | 215 | 261 | 121 | 115 |
| 2.45 | 251 | 322 | 128 | 131 |
| 2.41 | 244 | 317 | 130 | 132 |
|  | Average |  | 126 | 125 |

What is claimed is:

1. A disordered positive electrode for use in an alkaline rechargeable electrochemical cell comprising:

a nickel hydroxide material and carbon, where said nickel hydroxide material has at least one compositional modifier incorporated into it to promote a multiphase structure where each phase of said multiphase structure is a solid solution, said multiphase structure comprising at least one phase that is polycrystalline γ-phase material where cycling of said nickel hydroxide material and carbon takes place in disordered α and γ phases, said γ-phase material comprising spacedly disposed plates having a chemical modifier incorporated around said plates, said plates having a range of stable intersheet distances corresponding to a $2^+$ oxidation state and a $3.5^+$, or greater, oxidation state; and where said carbon provides for cycling of disordered α/γ phases of said nickel hydroxide material by promoting stability of multiple disordered nickel hydroxide phases;

increases surface area by creating density changes, and increases conductivity by the formation of filamentous conductive regions from areas of higher conductivity to individual nickel hydroxide particles.

2. The positive electrode claimed in claim 1, wherein said carbon is present in an amount of 5–20 wt %.

3. The positive electrode claimed in claim 2, wherein said carbon is present in an amount of 15 wt %.

4. The positive electrode claimed in claim 3, further comprising at least one chemical additive chosen from the group consisting of cobalt, cobalt oxide, cobalt hydroxide, manganese, and manganese hydroxides.

5. The positive electrode claimed in claim 2, further comprising at least one additive chosen from a group consisting of Co, CoO, and MnO.

6. The positive electrode claimed in claim 5, wherein said nickel hydroxide material comprises spherical particles.

7. The positive electrode claimed in claim 5, wherein said nickel hydroxide material is capable of transferring $\geq 1.5$ electrons per nickel atom.

8. The positive electrode claimed in claim 2, further comprising a foam or fiber substrate.

9. The positive electrode claimed in claim 1, wherein particles of said carbon are $\leq 10$ microns in size.

10. The positive electrode claimed in claim 9, wherein particles of said carbon are $\leq 5$ microns in size.

11. The positive electrode claimed in claim 10, wherein particles of said carbon are $\leq 2$ microns in size.

12. The positive electrode claimed in claim 1, wherein said chemical modifier is chosen from the group consisting of Al, Ba, Ca, Co, Cr, Cu, F, Fe, K, Li, Mg, Mn, Na, Sr, and Zn.

13. The positive electrode claimed in claim 1, where said compositional modifier is chosen from the group consisting of Al, Bi, Co, Cr, Cu, Fe, In, La, Mn, Ru, Sb, Sn, and Zn.

14. The positive electrode claimed in claim 13, where said compositional modifier is Co.

15. The positive electrode claimed in claim 13, where said compositional modifiers are Co and Zn.

16. The positive electrode claimed in claim 1 further comprising at least one chemical additive chosen from the group consisting of cobalt, cobalt oxide, cobalt hydroxide, manganese, and manganese oxides.

17. The positive electrode claimed in claim 1, wherein said disordered positive electrode has at least one structure selected from the group consisting of (i) amorphous;

(ii) microcrystalline;

(iii) polycrystalline lacking long range compositional order; and (iv) any combination of said amorphous, microcrystalline, or polycrystalline structures.

* * * * *